United States Patent

Macasaet

[11] Patent Number: 5,671,658
[45] Date of Patent: Sep. 30, 1997

[54] COOKING DEVICE

[76] Inventor: Jorge Macasaet, 79 Duval Dr., So San Francisco, Calif. 94080

[21] Appl. No.: 689,593

[22] Filed: Aug. 12, 1996

[51] Int. Cl.$^6$ ................................. A47J 37/00
[52] U.S. Cl. ...................... 99/384; 99/374; 99/380; 99/441
[58] Field of Search .................. 99/374, 384, 441, 99/372, 380, 381, 382, 383; 219/524

[56] References Cited

U.S. PATENT DOCUMENTS

| | | | |
|---|---|---|---|
| 1,990,412 | 2/1935 | Merritt | 99/381 X |
| 2,243,137 | 5/1941 | Vaughan | 99/381 |
| 2,282,500 | 5/1942 | Sohn | 99/381 |
| 2,804,009 | 8/1957 | Holland | 99/384 X |
| 3,669,006 | 6/1972 | Lee, Sr. | 99/380 X |

Primary Examiner—Reginald Alexander

[57] ABSTRACT

A new Waffle Sandwich Making System for cooking waffle sandwiches by pouring half of the required batter into the waffle sandwich molds, add fillings on top such as hot dogs, cheese, ham, sausage, and/or bacon along with a stick projecting outwardly from one end of the waffle sandwich allowing clean manual manipulation of the cooked waffle sandwich, and pouring the remaining batter over the filling and cooking. The inventive device includes a housing structure, a molding means within the housing structure and a heating means within the housing structure.

2 Claims, 3 Drawing Sheets

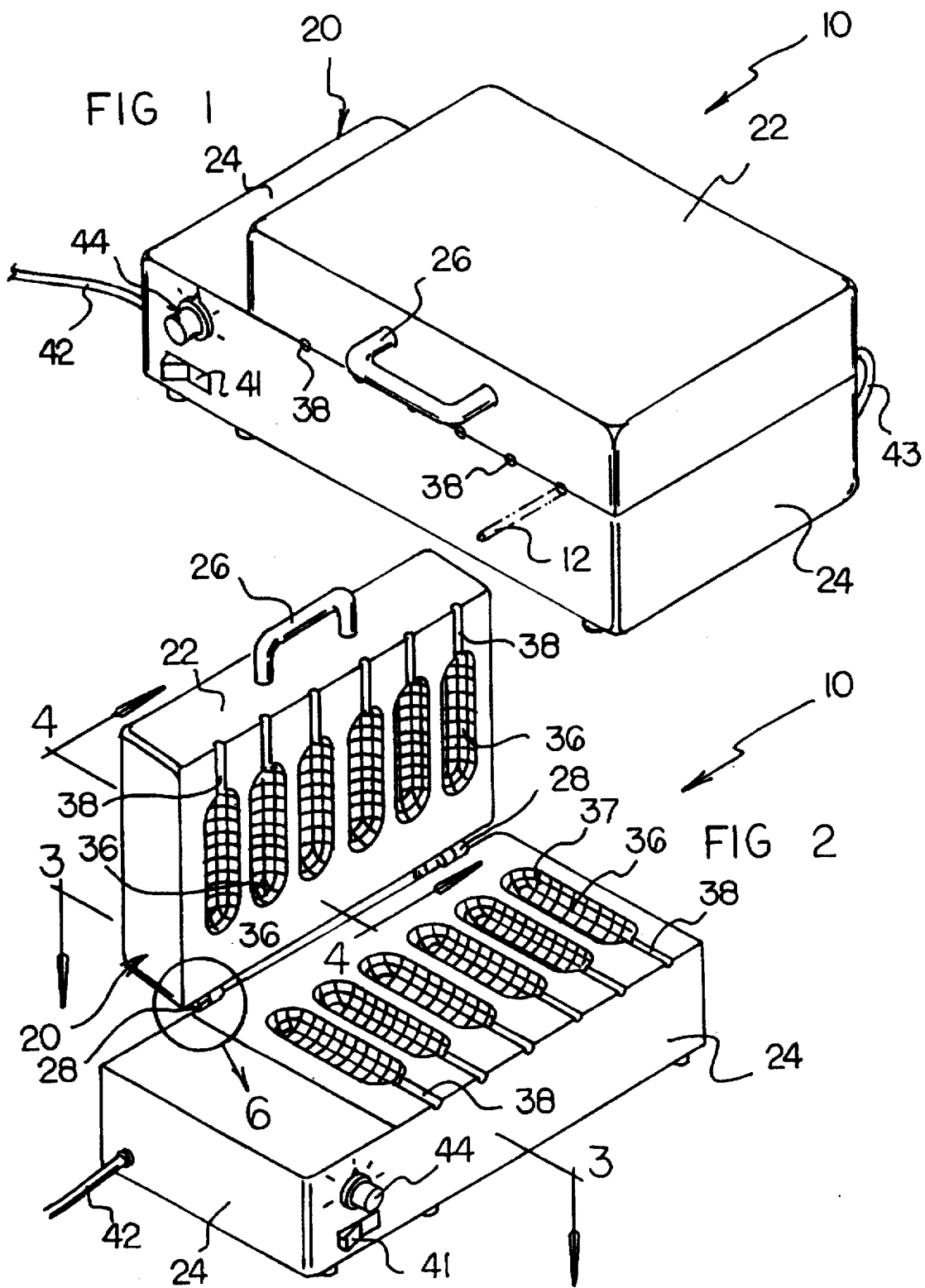

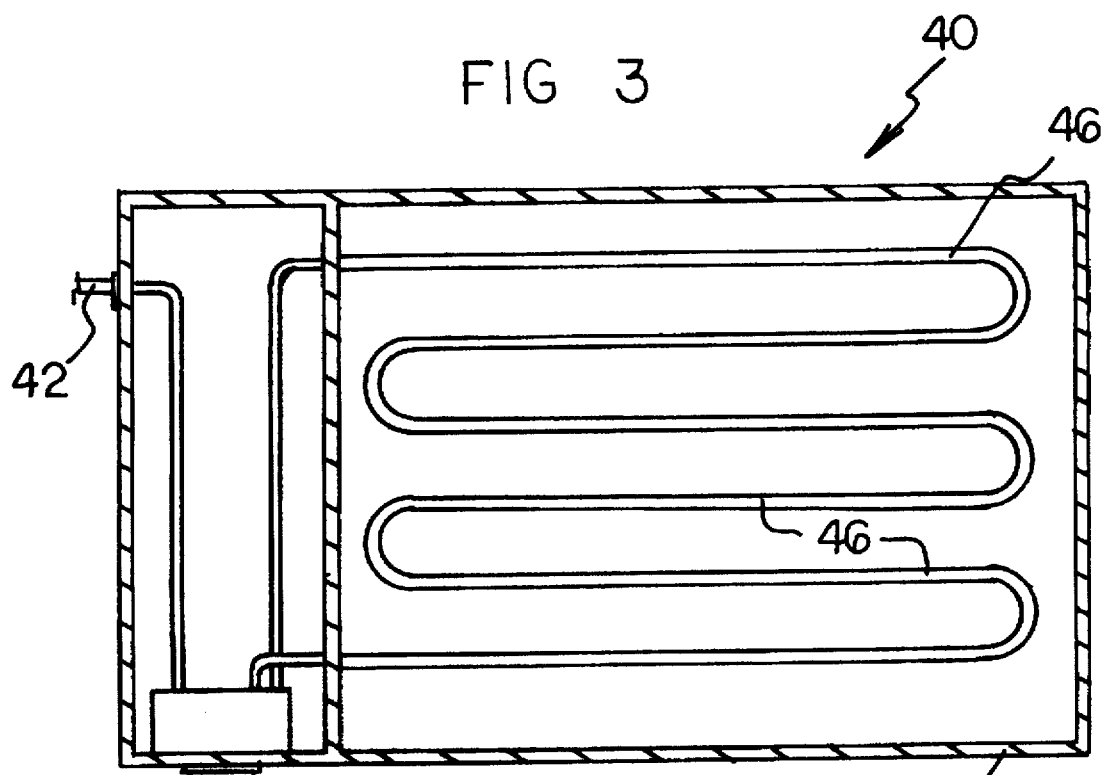
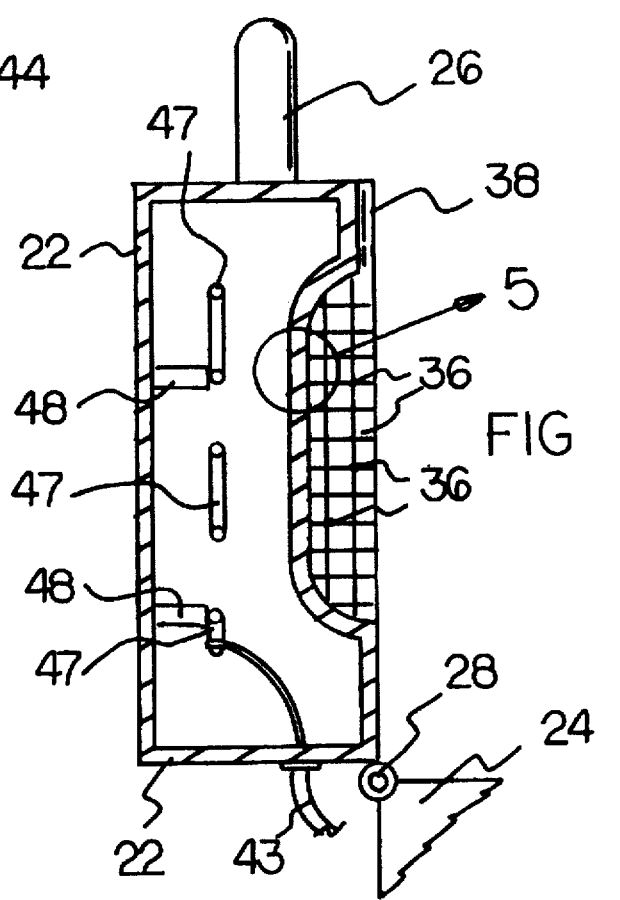

5,671,658

COOKING DEVICE

BACKGROUND OF THE INVENTION

1. Field of the Invention

The present invention relates to Waffle Devices and more particularly pertains to a new Waffle Sandwich Making System for cooking waffle sandwiches by pouring half of the required batter into the waffle sandwich molds, add fillings on top such as hot dogs, cheese, ham, sausage, and/or bacon along with a stick projecting outwardly from one end of the waffle sandwich allowing clean manual manipulation of the cooked waffle sandwich, and pouring the remaining batter over the filling and cooking.

2. Description of the Prior Art

The use of Waffle Devices is known in the prior art. More specifically, Waffle Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Waffle Devices include U.S. Pat. No. 4,967,650; U.S. Pat. No. 4,476,379; U.S. Design Pat. No. 309,549; U.S. Design Pat. No. 308,152; U.S. Design Pat. No. 345,487 and U.S. Pat. No. 4,206,345.

While these devices fulfill their respective, particular objectives and requirements, the aforementioned patents do not disclose a new Waffle Sandwich Making System. The inventive device includes a housing structure, a molding means within the housing structure and a heating means within the housing structure.

In these respects, the Waffle Sandwich Making System according to the present invention substantially departs from the conventional concepts and designs of the prior art, and in so doing provides an apparatus primarily developed for the purpose of cooking waffle sandwiches by pouring half of the required batter into the waffle sandwich molds, add fillings on top such as hot dogs, cheese, ham, sausage, and/or bacon along with a stick projecting outwardly from one end of the waffle sandwich allowing clean manual manipulation of the cooked waffle sandwich, and pouring the remaining batter over the filling and cooking.

SUMMARY OF THE INVENTION

In view of the foregoing disadvantages inherent in the known types of Waffle Devices now present in the prior art, the present invention provides a new Waffle Sandwich Making System construction wherein the same can be utilized for cooking waffle sandwiches by pouring half of the required batter into the waffle sandwich molds, add fillings on top such as hot dogs, cheese, ham, sausage, and/or bacon along with a stick projecting outwardly from one end of the waffle sandwich allowing clean manual manipulation of the cooked waffle sandwich, and pouring the remaining batter over the filling and cooking.

The general purpose of the present invention, which will be described subsequently in greater detail, is to provide a new Waffle Sandwich Making System apparatus and method which has many of the advantages of the Waffle Devices mentioned heretofore and many novel features that result in a new Waffle Sandwich Making System which is not anticipated, rendered obvious, suggested, or even implied by any of the prior art Waffle Devices, either alone or in any combination thereof.

To attain this, the present invention generally comprises a housing structure, a molding means within the housing structure and a heating means within the housing structure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Waffle Sandwich Making System apparatus and method which has many of the advantages of the Waffle Devices mentioned heretofore and many novel features that result in a new Waffle Sandwich Making System which is not anticipated, rendered obvious, suggested, or even implied by any of the prior art Waffle Devices, either alone or in any combination thereof.

It is another object of the present invention to provide a new Waffle Sandwich Making System which may be easily and efficiently manufactured and marketed.

It is a further object of the present invention to provide a new Waffle Sandwich Making System which is of a durable and reliable construction.

An even further object of the present invention is to provide a new Waffle Sandwich Making System which is susceptible of a low cost of manufacture with regard to both materials and labor, and which accordingly is then susceptible of low prices of sale to the consuming public, thereby making such Waffle Sandwich Making System economically available to the buying public.

Still yet another object of the present invention is to provide a new Waffle Sandwich Making System which provides in the apparatuses and methods of the prior art some of the advantages thereof, while simultaneously overcoming some of the disadvantages normally associated therewith.

Still another object of the present invention is to provide a new Waffle Sandwich Making System for cooking waffle sandwiches by pouring half of the required batter into the waffle sandwich molds, add fillings on top such as hot dogs, cheese, ham, sausage, and/or bacon along with a stick projecting outwardly from one end of the waffle sandwich allowing clean manual manipulation of the cooked waffle sandwich, and pouring the remaining batter over the filling and cooking.

Yet another object of the present invention is to provide a new Waffle Sandwich Making System which includes a housing structure, a molding means within the housing structure and a heating means within the housing structure.

Even still another object of the present invention is to provide a new Waffle Sandwich Making System wherein the user is able to make cylindrical waffles.

Still another object of the present invention is to provide a new Waffle Sandwich Making System that cooks the waffle batter with a stick projecting outwardly from the cooked waffle batter.

Another object of the present invention is to provide a new Waffle Sandwich Making System which allows easy manipulation of the cooked waffle batter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a right side perspective view of a new Waffle Sandwich Making System according to the present invention.

FIG. 2 is a left side elevation view with the housing structure retracted displaying the molding means.

FIG. 3 is a cross sectional view taken along line 3—3 of FIG. 2 of the drawings.

FIG. 4 is a cross sectional view taken along line 4—4 of FIG. 3 displaying the heating means and the top mold of the top housing.

DESCRIPTION OF THE PREFERRED EMBODIMENT

Figure 5:
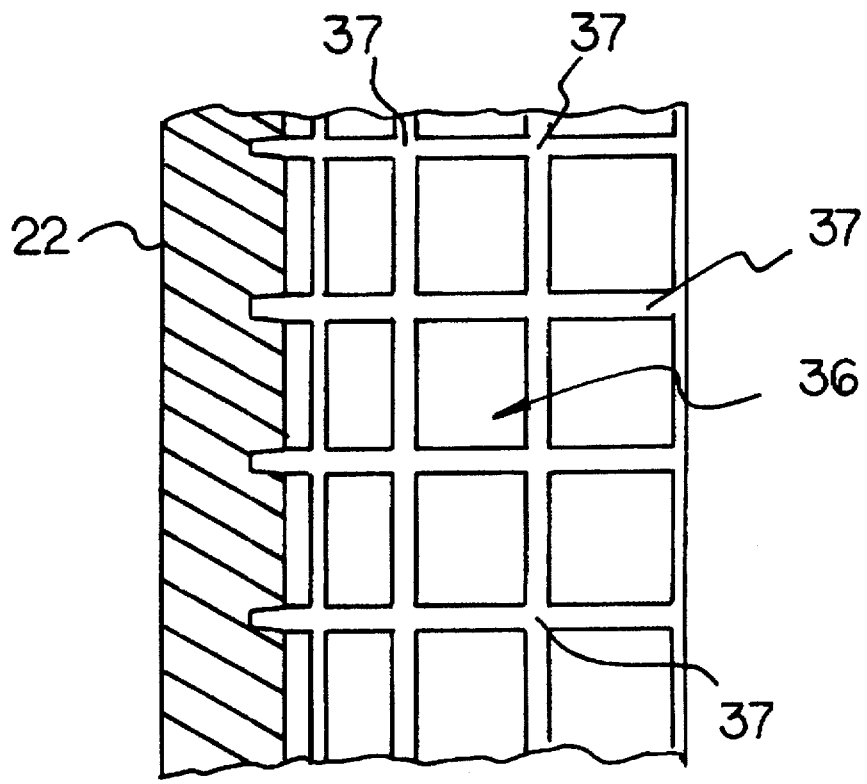
FIG. 5 is a magnified view of the raised ribs within the batter mold cavity from FIG. 4.
Figure 6:
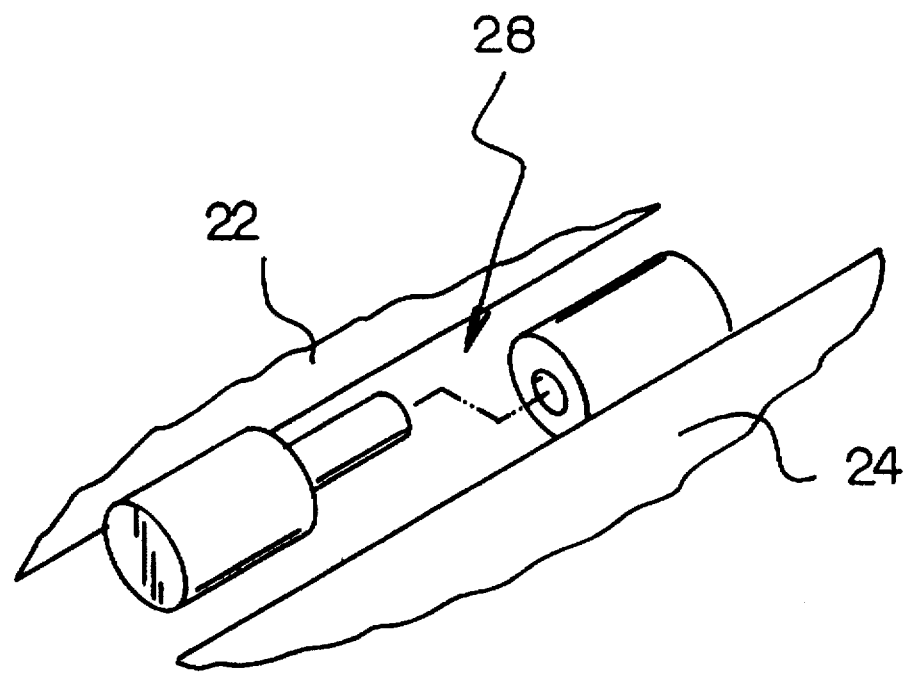
FIG. 6 is a magnified view of the hinge from FIG. 2.

With reference now to the drawings, and in particular to FIGS. 1 through 6 thereof, a new Waffle Sandwich Making System embodying the principles and concepts of the present invention and generally designated by the reference numeral 10 will be described.

More specifically, it will be noted that the Waffle Sandwich Making System 10 comprises a housing structure 20, a molding means 30 positioned within the housing structure 20 which retains an unnumbered waffle batter and a waffle stick 12 centrally positioned within the unnumbered waffle batter, and a heating means 40 positioned within the housing structure 20 near the molding means 30.

As best illustrated in FIGS. 1 through 6, it can be shown that the housing structure includes a bottom housing 24 substantially rectangular shaped. At least one hinge 28 is secured to the rear edge of the bottom housing 24. A top housing 22 is substantially rectangular shaped with a handle 26 secured to the exterior surface of the top housing 22 as best shown in FIG. 1 of the drawings. The top housing 22 is pivotally mounted to the bottom housing 24 and the top housing 22 is juxtaposed to the bottom housing 24 in the closed position. The top housing 22 includes a plurality of batter mold cavities 36 in the side engaging the bottom housing 24. A stick passage 38 projects from the front edge of the top housing 22 into the batter mold cavity receiving a waffle stick 12 as best shown in FIG. 2 of the drawings. The bottom housing 24 includes a plurality of batter mold cavities 36 in the side engaging the top housing 22 which correspond to the plurality of batter mold cavities 36 in the top housing 22. A stick passage 38 projects from the front edge of the bottom housing 24 into the batter mold cavity receiving a waffle stick 12. The batter mold cavities 36 of the top housing 22 and the bottom housing 24 form a prolate shape when juxtaposed. The batter mold cavities 36 include a plurality of raised ribs 37 forming a reticulated surface which engages the unnumbered waffle batter. The heating means 40 includes a first power cord 42 as best shown in FIG. 3 of the drawings. A power switch 41 is electronically connected to the first power cord 42. A temperature controller 44 is electronically connected to the power switch 41. A bottom heating coil 46 is electronically connected to the temperature controller 44 and positioned within the bottom housing 24 substantially horizontal near the batter mold cavities 36. A second power cord 43 is electronically connected to the temperature controller 44 and projects out of the bottom housing 24 into the top housing 22. A top heating coil 47 is electronically connected to the second power cord 43 and positioned within the top housing 22 substantially horizontal near the batter mold cavities 36. The top heating coil 47 is supported to the top housing 22 by a plurality of heat resistant coil support members 48 as shown in FIG. 4 of the drawings.

In use, the user prepares the unnumbered waffle batter and the unnumbered fill such as hot dogs, cheese, ham, sausage, and/or bacon and pours a portion of the waffle batter into the retracted housing structure 20 exposing the molding means 30 and places on top of the batter the fill and the waffle stick 12 into the stick passage 38 and further into the waffle batter and fill and finishes by pouring the remainder of the batter over the fill and waffle stick 12. The user then closes the top housing 22 onto the bottom housing 24 sealing the corresponding batter mold cavities 36 of the top housing 22 and the bottom housing 24. After the unnumbered waffle batter is fully cooked, the user then retracts the top housing 22 exposing the unnumbered prolate shaped cooked waffle with the waffle stick 12 projecting from one end of the unnumbered prolate shaped cooked waffle. The user then removes the unnumbered cooked waffle sandwich by grasping the waffle stick 12 and then eats the unnumbered prolate shaped cooked waffle sandwich. The user also has the option of cooking the waffle sandwich without the waffle stick 12 being utilized.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cooking device comprising:

a housing structure including:
  a bottom housing substantially rectangular shaped:
  at least one hinge secured to the rear edge of the bottom housing;
  a top housing substantially rectangular shaped with a handle secured to the exterior surface of the top housing where the top housing is pivotally mounted to the bottom housing and the top housing juxtaposed to the bottom housing in the closed position;

a molding means positioned within the housing structure which retains a waffle batter, a fill and a waffle stick centrally positioned within the waffle batter and the fill;

a heating means positioned within the housing structure near the molding means; and the molding means includes:
  the top housing including a plurality of batter mold cavities in the side engaging the bottom housing and a stick passage projecting from the front edge into the batter mold cavity for receiving a waffle stick;
  the bottom housing including a plurality of batter mold cavities in the side engaging the top housing that correspond to the plurality of batter mold cavities in the top housing: and another stick passage projecting from the front edge into the batter mold cavity and aligned within said stick passage projecting into said top housing for receiving said waffle stick; and
  the batter mold cavities of the top housing and the bottom housing when juxtaposed form a prolate shape and the batter mold cavities include a plurality of raised ribs forming a reticulated surface.

2. The Waffle Sandwich Making System of claim 1, wherein the heating means includes:

a first power cord;

a power switch electronically connected to the first power cord;

a temperature controller electronically connected to the power switch;

a bottom heating coil electronically connected to the temperature controller and positioned within the bottom housing substantially horizontal near the batter mold cavities;

a second power cord electronically connected to the temperature controller and projecting out of the bottom housing into the top housing; and a top heating coil electronically connected to the second power cord and positioned within the top housing substantially horizontal near the batter mold cavities supported to the top housing by a plurality of heat resistant coil support members.

* * * * *